July 3, 1923.
R. KROEDEL
CAMERA SUPPORT
Filed Sept. 8, 1922
1,460,816
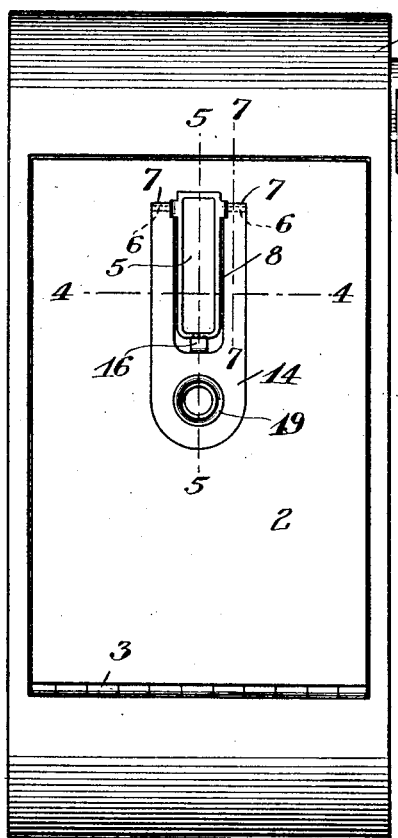
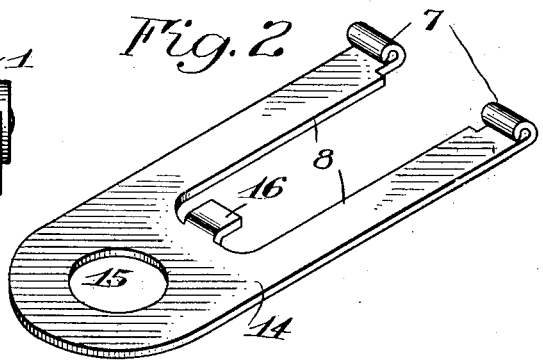
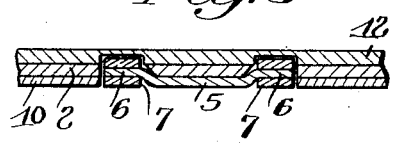
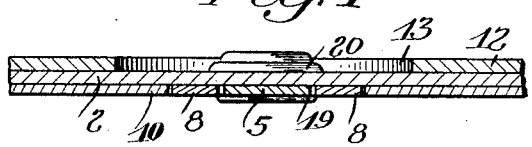
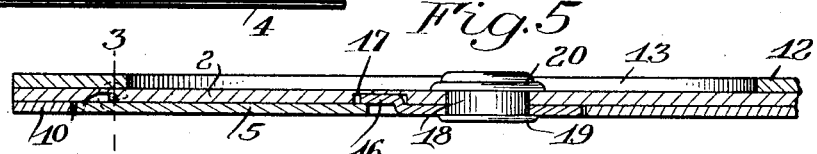
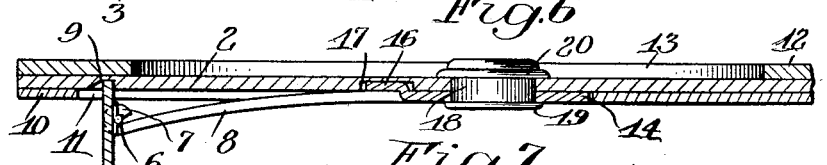
INVENTOR.
Robert Kroedel
BY
his ATTORNEY Patented July 3, 1923.

1,460,816

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

CAMERA SUPPORT.

Application filed September 8, 1922. Serial No. 586,994.

*To all whom it may concern:*

Be it known that I, ROBERT KROEDEL, a citizen of the United States, residing at Rochester, in the county of Monroe and State of New York, have invented certain new and useful Improvements in Camera Supports; and I do hereby declare the following to be a full, clear, and exact description of the same, reference being had to the accompanying drawings, forming a part of this specification, and to the reference numerals marked thereon.

My present invention relates to photography and, more particularly, to folding hand cameras wherein a door at the front of the camera body is opened or extended for the purpose of providing a bed on which the focusing mechanism is projected, and it has for its object to provide a simple, efficient and convenient folding leg for supporting the bed when extended in combination with a threaded nut for the attachment of a tripod when desired, these two devices being assembled together in such a way as to simplify the manufacture of the camera and produce an attractive and compact structure. To these and other ends the invention consists in certain improvements and combinations of parts, all as will be hereinafter more fully described, the novel features being pointed out in the claims at the end of the specification.

In the drawings:

Figure 1 is a front view of a folding camera provided with a supporting leg and tripod attachment constructed in accordance with and illustrating one embodiment of my invention;

Figure 2 is an enlarged perspective view of the leg supporting plate viewed from its upper or inner side;

Figure 3 is an enlarged fragmentary section on the line 3—3 of Figure 5;

Figure 4 is an enlarged fragmentary section on the line 4—4 of Figure 1;

Figure 5 is an enlarged fragmentary section taken longitudinally through the bed on the line 5—5 of Figure 1;

Figure 6 is a similar view but showing the leg in extended or operative position, and Figure 7 is an enlarged fragmentary section on the line 7—7 of Figure 1.

Similar reference numerals throughout the several views indicate the same parts.

I have illustrated my improvement as applied to a familiar type of folding pocket camera embodying a body 1 and a bed 2 hinged thereto at 3 and normally closing the front of the body in the manner of a door, all of the parts being shown in folded position in Figure 1. When the camera is extended for use and the bed 2 is swung downwardly to a horizontal position the camera may be supported on a table or other surface partly by resting on its lower end face 4 and partly by the folding leg 5 which is extended from the under face of the bed from the positions of Figures 1 and 5 to that of Figure 6, the length of the leg 5 being such as to agree with the distance 3 to 4 and thereby support the forward portion of the camera with the bed 2 horizontal.

The leg 5 with which this invention is concerned preferably is in the form of a flat metal plate having trunnions or laterally extending pivot pins 6 at its upper end. These trunnions are received by and turn in a pair of bearing eyes 7 in the outer ends of two spring arms 8 which have a tendency to lie close against the bottom of the bed on the outer side thereof, as shown in Figures 1 and 5, but they are placed under tension when the leg 5 is unfolded due to the fact that the pivots 6 are removed from the inner end of the latter and this inner end swings into a notch or recess 9 in the bed plate which acts as an anchoring stop to hold the leg at right angles to the bed. In this position the spring arms 8 are acting against the bed center because they are tending to press the pivot 6 in a direction alined with the longitudinal extent of the leg and the arms are therefore powerless to operate the leg and remain under tension with the leg held in the notch 9. As soon however as the leg 5 is rotated a short distance by hand to start the end portion out of the notch 9 a fulcrum is provided that is off of the dead center of the pivot bearing 6 and the spring arms 8 are enabled to move back against the bed and in doing so to carry the pivots 6 with them which automatically folds the leg the rest of the way and causes it to snap back close against the bed, as in Figures 1 and 5, where it is retained by the spring arms.

On the exterior the bed 2, usually constituted by a metal plate, is covered with a leather or other similar finishing material 10 which, in the present instance, is preferably recessed at 11 to form a cavity for the accommodation of the leg 5 and the arms 8 so that they will lie flush when folded with the outer surface of the camera. On its upper or inner surface the bed is provided with the usual extension bed plate 12 which is of no interest herein beyond an explanation of the fact that it is provided with a central recess or slot 13 to give clearance for parts hereinafter referred to.

The spring arms 8 form part of a bifurcated attaching and supporting plate 14 for the leg 5. The opposite or solid end of this plate is provided with an aperture 15. This whole plate lies within the cavity 11 and is further provided at the base of its bifurcated portion between the arms 8 with an offset ear 16 which takes into a further recess 17 in the bed plate 2 to lock the plate against lateral movement or rotation relatively to the bed plate.

The purpose of the aperture 15 is to receive the central cylindrical portion of a tripod nut 18 which is the usual interiorly threaded grommet by means of which the camera is secured to the attaching screw of a tripod. One end of the nut is riveted or spun over against the plate 14 at 19 while the other end extends through the bed plate 2 and is spun over or riveted against the upper and inner face of the latter at 20 to project within the opening 13 of the extension bed. In this way the tripod nut is readily accessible for its own purposes but performs the dual function of efficiently securing the plate 14 and hence the leg 5 in place on the camera, all of these parts being thereby assembled together.

I claim as my invention:

1. In a folding camera, the combination with a body and a bed hinged thereto, of a folding pivoted leg for supporting the bed when extended, a plate on the bed supporting the leg bearings, and a threaded nut adapted for the connection of a camera supporting tripod, said nut being arranged to secure the plate to the bed.

2. In a folding camera, the combination with a body and a bed hinged thereto, of a plate arranged on the under side of the bed having an aperture therein at one end and two spring arms terminating in pivot bearings at the other end, a folding bed supporting leg pivoted in the bearings and a threaded tripod nut extending through the aperture in the plate and through the bed and operating to secure the former to the latter.

ROBERT KROEDEL.